United States Patent [19]
Sudau et al.

[11] Patent Number: 5,878,856
[45] Date of Patent: Mar. 9, 1999

[54] FLYWHEEL DEVICE WITH A SYSTEM OF PLAIN BEARINGS

[75] Inventors: Jörg Sudau, Niederwerrn; Bernhard Schierling, Kürnach; Hilmar Göbel, Grafenrheinfeld; Jürgen Kleifges, Schweinfurt; Cora Carlson, Hambach, all of Germany

[73] Assignee: Fichtel & Sachs AG, Schweinfurt, Germany

[21] Appl. No.: 813,147

[22] Filed: Mar. 7, 1997

[30] Foreign Application Priority Data

| Mar. 8, 1996 | [DE] | Germany | 196 09 043.1 |
| May 13, 1996 | [DE] | Germany | 196 19 059.2 |
| May 23, 1996 | [DE] | Germany | 196 20 698.7 |
| Nov. 2, 1996 | [DE] | Germany | 196 45 174.4 |

[51] Int. Cl.$^6$ .......................... F16F 15/139; F16F 15/131
[52] U.S. Cl. .......................... 192/70.17; 74/574; 192/110; 192/204
[58] Field of Search .................. 192/70.17, 110, 192/204; 74/574; 464/66, 68

[56] References Cited

U.S. PATENT DOCUMENTS

| 4,222,246 | 9/1980 | Rongley | 464/77 |
| 4,453,838 | 6/1984 | Loizeau | 192/204 X |
| 4,635,780 | 1/1987 | Wiggen | 192/204 |
| 5,064,041 | 11/1991 | Graton et al. | 192/70.17 X |
| 5,169,357 | 12/1992 | Graton | 464/68 |
| 5,496,216 | 3/1996 | Rohrle et al. | 464/66 |
| 5,722,525 | 3/1998 | Ament et al. | 192/204 X |

FOREIGN PATENT DOCUMENTS

| 3411092 | 5/1985 | Germany . |
| 3515928 | 11/1986 | Germany . |

Primary Examiner—Charles A. Marmor
Assistant Examiner—Saul Rodriguez
Attorney, Agent, or Firm—Nils H. Ljungman and Associates

[57] ABSTRACT

A flywheel device has at least two inertial masses which can rotate relative to one another against the action of elastic elements of a damping device, one of which inertial masses, namely the output-side inertial mass which is farther from a drive system, such as for example the crankshaft of an internal combustion engine, is guided both radially and axially by way of a bearing arrangement with respect to the input-side inertial mass. The bearing arrangement has at least one axial plain bearing and one radial plain bearing. Both plain bearings guide the output-side inertial mass with respect to the input-side inertial mass with a clearance, the size of which is determined so that when a wobbling motion is introduced from the crankshaft to the input-side inertial mass, the output-side inertial mass, under the effect of centrifugal forces, can perform a self-stabilization. The radial plain bearing, to bring it as close as possible to the crankshaft, is engaged in the vicinity of the end of the hub of the output-side inertial mass, which end faces the crankshaft.

20 Claims, 7 Drawing Sheets

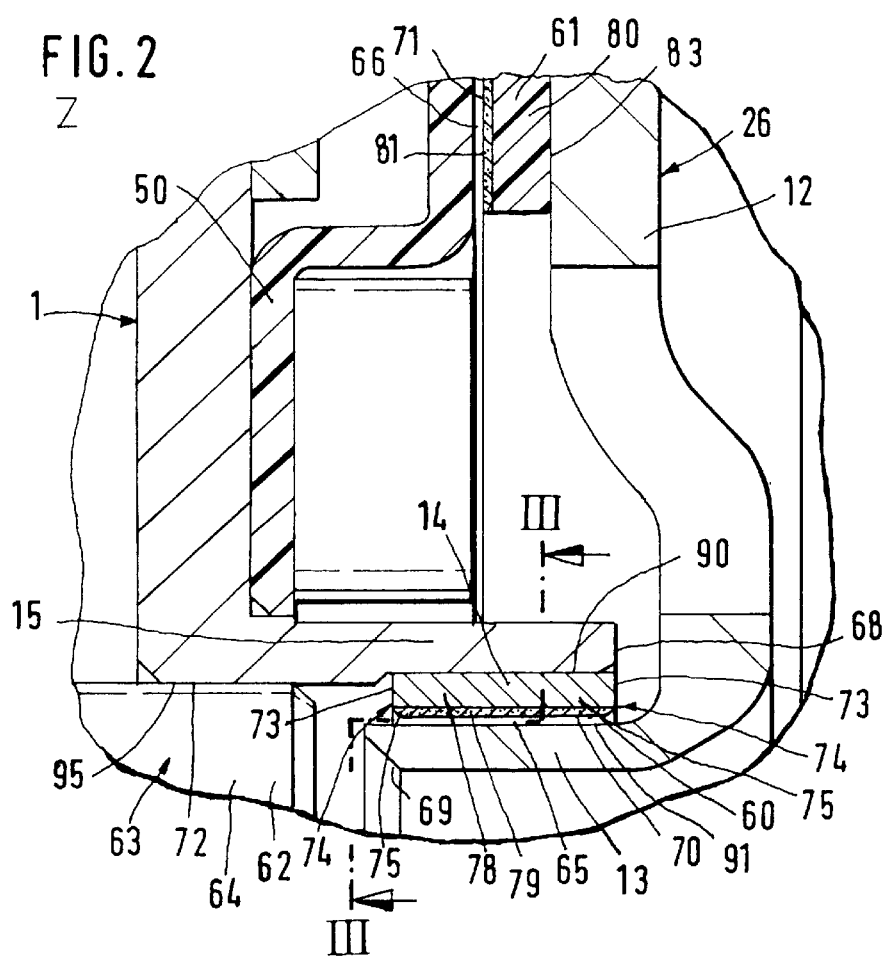
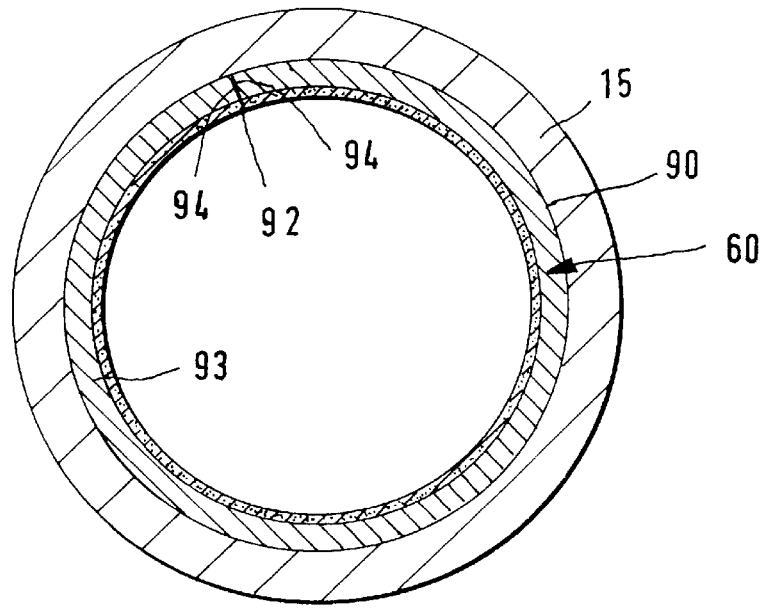

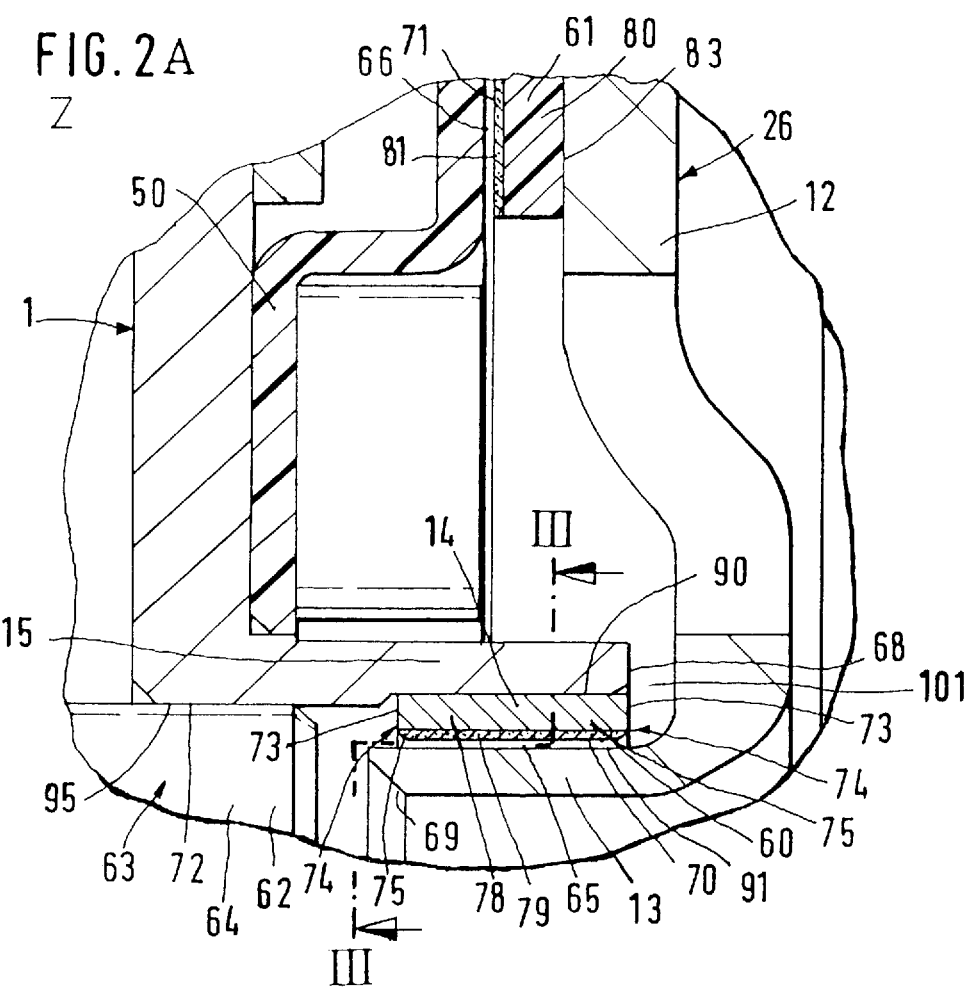

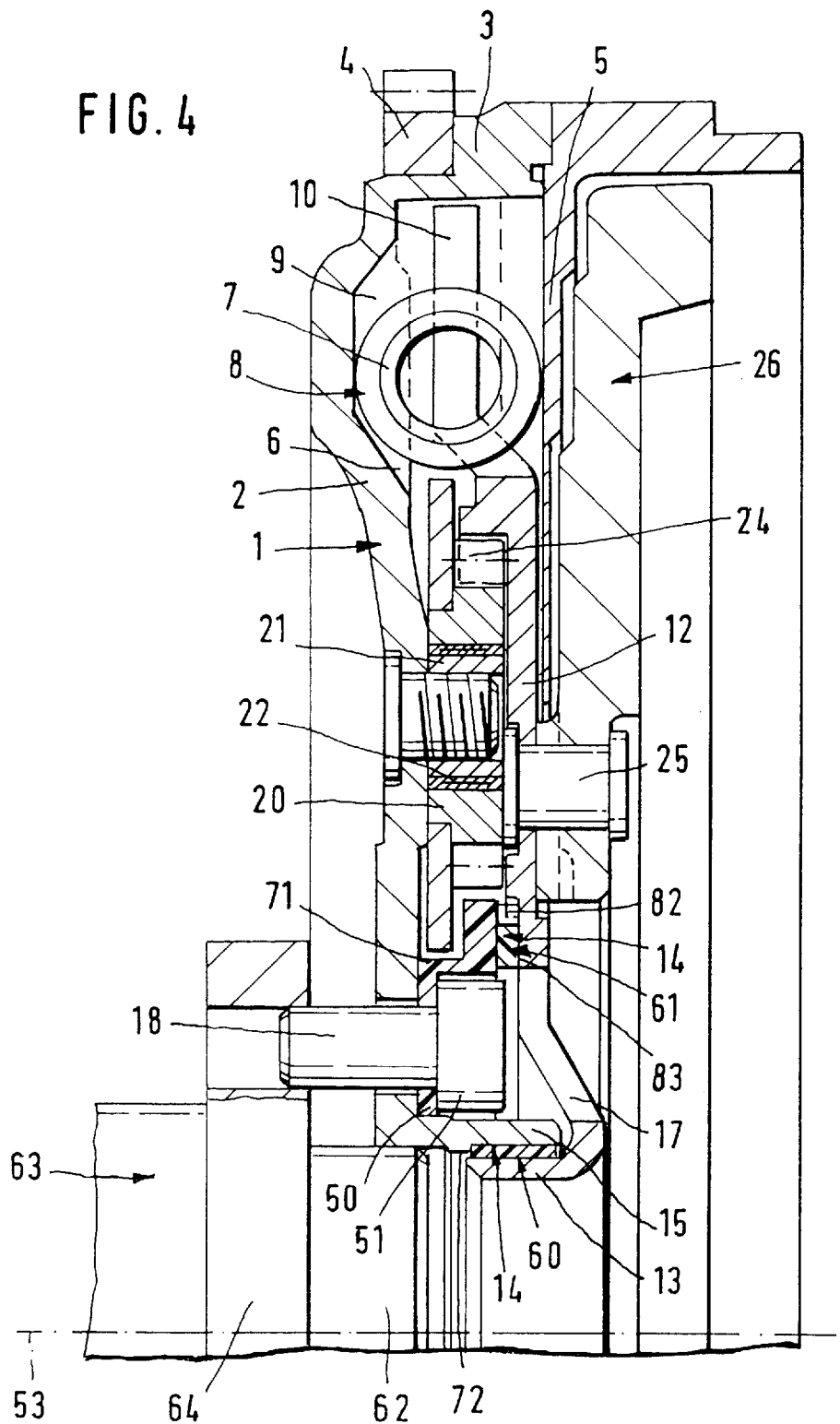

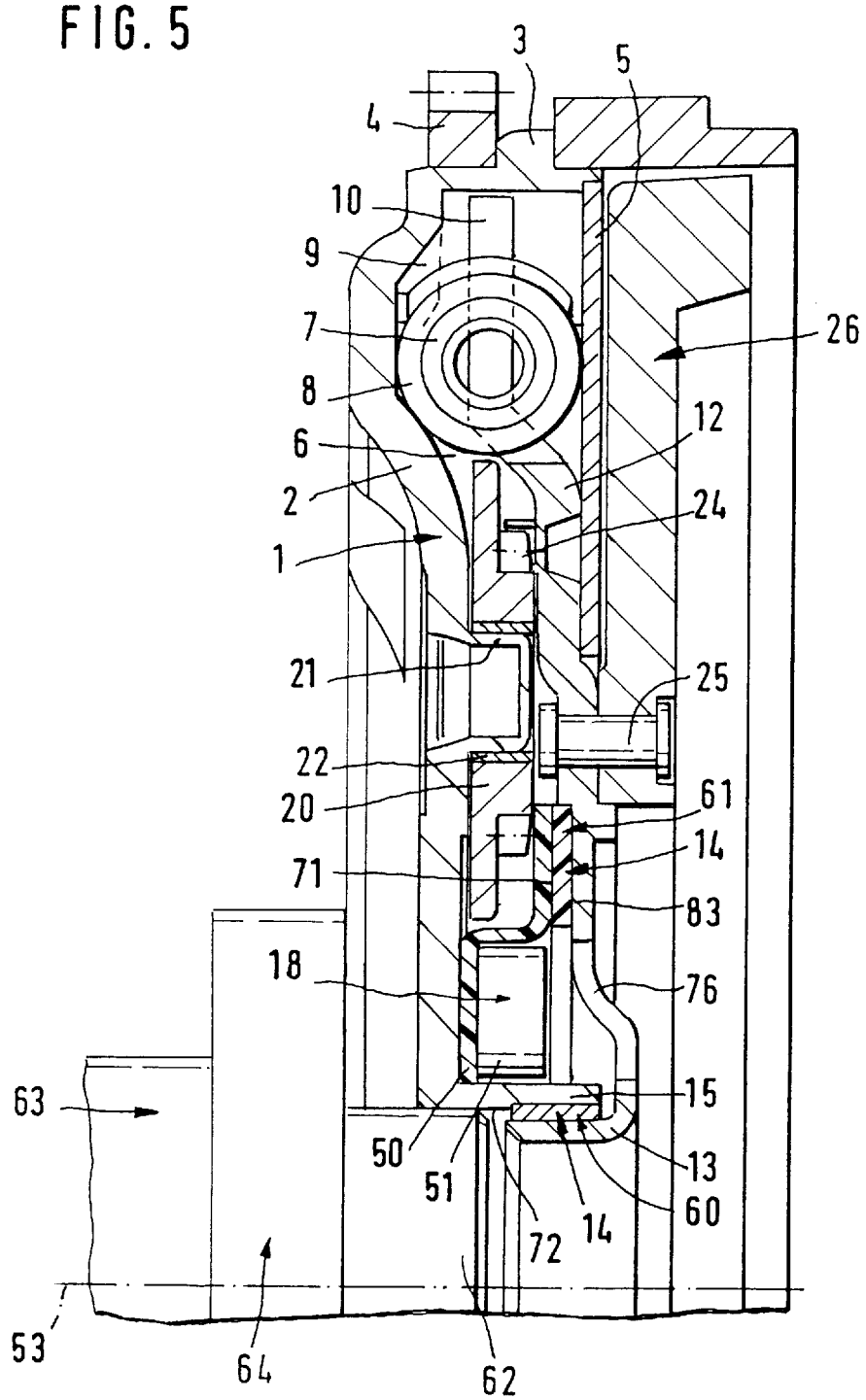

FLYWHEEL DEVICE WITH A SYSTEM OF PLAIN BEARINGS

BACKGROUND OF THE INVENTION

1. Field of the Invention

This invention relates to a flywheel device which has at least two inertial masses which can rotate relative to one another. The inertial mass device also comprises a damping device which damping device comprises elastic elements which elastic elements act against the rotation of the inertial masses with respect to one another. The output side inertial mass is guided both radially and axially by a bearing arrangement with respect to the input side inertial mass, which bearing assembly comprises at least one axial plain bearing and at least one radial plain bearing. The input side inertial mass can be, for example, connected to the crankshaft of an internal combustion engine.

2. Background Information

German Patent No. 34 11 092 C2 describes a known inertial mass device which has two inertial masses which can rotate relative to one another against the action of elastic elements which are in the form of coil springs of a damping device. One of these inertial masses, namely the output-side inertial mass, is guided by means of a bearing arrangemt both radially and axially with respect to the input-side inertial mass, whereby the bearing arrangement has an axial plain bearing and a radial plain bearing. While the axial plain bearing is clamped between the crankshaft of an internal combustion engine and an axial center or pilot stud which is realized on the second inertial mass, the radial plain bearing is located between a hub which is realized on the input-side inertial mass and faces the output-side inertial mass and the above-mentioned center stud, and therefore surrounds the axial plain bearing.

As explained in greater detail in the descriptive portion of this above-mentioned patent, the two inertial masses are axially clamped together or are axially biased toward one another. Consequently, wobbling movements which occur on the crankshaft of the internal combustion engine are transmitted not only to the input-side inertial mass which is fastened to this crankshaft, but also to the output-side inertial mass which, as indicated above, comes in contact with the crankshaft via the axial plain bearing, namely on account of the clamping under an axial force. The radial plain bearing between the two inertial masses is thereby protected, of course, because there are no sharp edges on it, but the wobbling movements are transmitted without filtration to the output-side transmission shaft, which results in undesirable loads in the transmission.

German Patent No. 35 15 928 A1 describes a known radial plain bearing which is located between two inertial masses which are movable in relation to one another. This plain bearing is located at a significant axial distance from the crankshaft of the internal combustion engine, so that, on account of the above-mentioned axial distance, wobbling movements which are applied to the end of the crankshaft facing the inertial mass device make themselves felt to a significant extent on the radial plain bearing perpendicular to the axis of rotation of the inertial masses, and accordingly the radial plain bearing is exposed to significant surface pressures. This problem is also basically encountered in the German patent discussed above, but the surface pressure on the radial plain bearing is counteracted by the axial clamping of the two inertial masses, although as mentioned above, that has its own additional disadvantages.

OBJECT OF THE INVENTION

The object of the invention is to improve an inertial mass device in which inertial masses are supported in relation to one another by plain bearings, such that on one hand, the surface pressure caused by wobbling movements introduced from the input side, in particular on the radial plain bearing, can be kept as low as possible, and on the other hand, the transmission of wobbling movements to the output-side inertial mass is reduced as far as possible.

SUMMARY OF THE INVENTION

The invention teaches that this object can be accomplished by having the radial plain bearing or friction bearing or sliding bearing and the axial plain bearing guide the output side inertial mass with respect to the input side inertial mass with a clearance or play. The play has a size such that when a wobbling movement is introduced from the crankshaft to the input side inertial mass, the output side inertial mass can perform a self-stabilization. The radial plain bearing is engaged adjacent the end of the hub of the output side inertial mass which end faces the crankshaft. Because both the radial plain bearing and the axial plain bearing are designed so that the output-side inertial mass is mounted with some clearance or play with respect to the input-side inertial mass, the selection of an appropriate dimension for the clearance ensures that input-side wobbling movements introduced on the input-side inertial mass by means of the end of the crankshaft which faces the inertial mass device can of course be transmitted with a residual amount via the respective plain bearing to the output-side inertial mass, but on account of the clearance with respect to the plain bearings, the output-side inertial mass is capable of self-stabilization under the effect of the centrifugal forces which are acting when it rotates, so that the wobbling movements which occur on the input-side inertial mass are not transmitted by the output-side inertial mass to the transmission shaft and thereby into the transmission. The clearance which exists effectively ensures that, in spite of a relative movement of the two inertial masses both in the axial direction and in the radial direction, the surface pressure applied to the respective plain bearing does not exceed an acceptable level. This advantage is supported by the additional characteristic that the radial plain bearing is placed as close as possible to the crankshaft of the propulsion system, i.e. of the internal combustion engine, so that wobbling movements which are applied to this end of the crankshaft still have relatively small components of movement perpendicular to the axis of rotation of the inertial masses, so that there is only a small load on the radial plain bearing.

In an additional aspect of the present invention, this situation is promoted by keeping the diameter of the track of the radial plain bearing as small as possible, i.e. by limiting it to a maximum of the diameter for a centering of the crankshaft lying in the input-side inertial mass, because when the track of the radial plain bearing is close to the axis of rotation of the two inertial masses, excursion movements caused by the crankshaft and perpendicular to this axis of rotation are still relatively small.

On a radial plain bearing, if wobbling movements are introduced, the axial ends are exposed to the greatest surface pressure, and namely in particular on the side of the plain bearing which acts as the track. For this reason, the invention teaches that the axial ends of the plain bearing, on its side acting as the track, are realized so that they have a reduced cross section which increases the distance from the corresponding hub, whereby the reduced cross section is preferably accomplished by a rounding off. Stress peaks in the plain bearing can thereby be reduced to a safe level.

In an additional aspect, the invention teaches that the hub which is facing the track for the radial plain bearing is located on the corresponding inertial mass by means of a mounting which is elastically deformable in the axial direction. This arrangement has the advantage that when wobbling movements are introduced by the crankshaft or by the input-side inertial mass which is non-detachably connected to the crankshaft, the hub of the output-side inertial mass can execute displacement movements which are accompanied by an elastic deformation of the mounting, as a result of which the hub, and along with the hub the radial plain bearing, can always be displaced at an angle with respect to the axis of rotation of the inertial masses at which, in spite of the displacement of the input-side inertial mass under the action of the wobbling movement, only a minimal surface pressure is exerted on the radial plain bearing.

The radial plain bearing is preferably formed by a ring which, before installation in the hub of the corresponding inertial mass, is realized with an axial seam which is not only closed by pressing the ring into the hub, but also introduces a bias into the ring by the application of a surface pressure on the two ends of the ring in the vicinity of the above-mentioned seam, as a result of which the ring is held in the hub by friction. The invention teaches that the radial-plain bearing is preferably made of a high-strength carrier material, such as steel, which is in frictional contact with the hub of the inertial mass which frictionally holds the plain bearing in place, while the other side of the plain bearing which faces the respective other inertial mass, i.e. the track, is provided with a softer coating which, the invention teaches, is preferably made of a fusion-sintered porous bronze with inclusions of polytetrafluoroethylene, i.e. Teflon, and dry lubricant such as graphite or PEEK plastic, whereby the above mentioned abbreviation PEEK stands for polyetheretherketone. The axial plain bearing can be realized in a similar manner, but on the axial plain bearing, care must be taken that the side realized with the high-strength carrier material cannot execute any relative movement with respect to the neighboring inertial mass, because otherwise there can be wear in the area of contact with the plain bearing caused by friction. The invention teaches that such a relative movement can be prevented by the use of a rotation lock, i.e. a device to prevent rotation on the axial plain bearing with respect to the corresponding inertial mass.

The axial friction bearing can likewise be made of plastic, in which case the rotation lock can be omitted. Preference is given to the use of a plastic in which Teflon is added as a lubricant, whereby the invention teaches that a glass fiber reinforcement can be provided to strengthen the axial plain bearing. It is also conceivable that the axial plain bearing can be made of PEEK plastic.

The invention teaches that the axial plain bearing, at its minimum diameter, is at least as large as the radial plain bearing. As a result of this measure, it is possible by means of the axial plain bearing to relatively effectively counteract wobbling movements of the input-side inertial mass, but only after the clearance between the input-side inertial mass and the plain bearing has been used up or in other words the clearance has been filled or exhausted. As disclosed in additional aspects of the present invention, the axial plain bearing can thereby be located in a separate location of the inertial mass device, i.e. it can be spatially separated from the radial inertial bearing. The axial plain bearing can also be realized adjacent to the radial plain bearing or can even be realized in one piece with the radial plain bearing.

The invention teaches that axial fastening means can be provided on the axial plain bearing for the attachment to the corresponding inertial mass. These fastening means can preferably be realized in the form of clips which penetrate the corresponding recesses of the inertial mass and then grasp it from behind, and thereby prevent a detachment of the axial plain bearing from this inertial mass. The use of such fastening means also makes it possible to omit, if desired, a device which prevents relative rotation between the output-side inertial mass and the axial plain bearing.

The invention teaches that as a result of the manufacture on both inertial masses of the respective hub by mechanical deformation, e.g. by a process such as deep drawing, when the inertial masses are made of a deformable material such as sheet metal, the deformation process which is necessary in any case to produce the specified shape can also be used on such inertial masses, with the appropriate configuration and movement of the deformation tools, so that the hub can be manufactured during this same deformation process. When the hub is manufactured as part of this process, neither additional material nor an additional manufacturing process on the inertial mass is necessary to manufacture the hub. The material is displaced so that, as claimed by the invention, the hubs of the inertial masses have a smaller material cross section than the other areas of the inertial masses. As a result of the non-cutting deformation process, a grain compression or densification therefore can occur which makes it possible, without an additional hardening process, to achieve a sufficient strength of the hub to hold the corresponding plain bearing arrangement. Moreover, as a result of an appropriate realization of the deformation tool with a smooth surface and sufficient hardness, the hub can be manufactured so that it emerges from the non-cutting deformation smooth, i.e. so that no finishing steps are necessary and the plain bearing can be inserted immediately without any expectation of damage to the plain bearing, which is true in particular for the insertion of one of the inertial masses on the track of the plain bearing which is realized with a relatively soft coating. In this case, a surface roughness with values between Rz1 and Rz4 can be achieved.

a result of the measure of loading the two inertial masses only with the clutch release bearing pre-load in the axial direction toward one another, the invention teaches that it is possible to prevent the secondary inertial mass, in the event of wobbling movements, from being displaced in the axial direction together with the input-side inertial mass, and namely with a relatively high frequency, which displacement in the axial direction can be reflected, following transmission via the friction clutch and the clutch release bearing, as pulsing in the clutch pedal.

As a result of the measure claimed by the invention of realizing a web in the radial dimension of the radial plain bearing, and namely on the cooling air inlet side of the installation openings provided on the output side, the invention ensures that any solid particles in the cooling air which is sucked in during the rotation of the inertial mass penetrate or enter radially outside the radial plain bearing, and are accordingly not deposited in the vicinity of the radial plain bearing's tracks, but radially outside the tracks. Consequently, abrasive wear to the radial plain bearing caused by penetrating particles is minimized or prevented. This web is preferably extended outward to the outside periphery of a hub of one of the inertial masses which surrounds the radial plain bearing from radially outside, so that the entry path for the cooling air and thus also the entry path for the solid parties lies radially significantly outside the track of the radial plain bearing in question. It is thereby guaranteed that a minimal amount of solid particles or no solid particles can accumulate in this axial space, even if the radial plain bearing must be located at some axial distance from the installation openings. This web is particularly effective if, as claimed by the present invention, it is provided on the output-side inertial mass, because a relatively large quantity of solid particles is released by the friction linings of the clutch disc on the friction clutch which is connected to the output-side inertial mass in a known manner.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

One embodiment of the invention is explained in greater detail below, with reference to the accompanying drawings, in which:

FIG. 2 is an enlarged detail of the circled portion of FIG. 1;

FIG. 2A shows the same view as FIG. 2 with additional detail;

FIG. 3 is a cross section along Line A—A in FIG. 2;

FIG. 4 is similar to FIG. 1, but with a device to prevent rotation between the axial plain bearing and the corresponding inertial mass;

FIG. 5 is similar to FIG. 1, but with an elastic locator for the radial plain bearing;

DESCRIPTION OF THE PREFERRED EMBODIMENT

Figure 1:
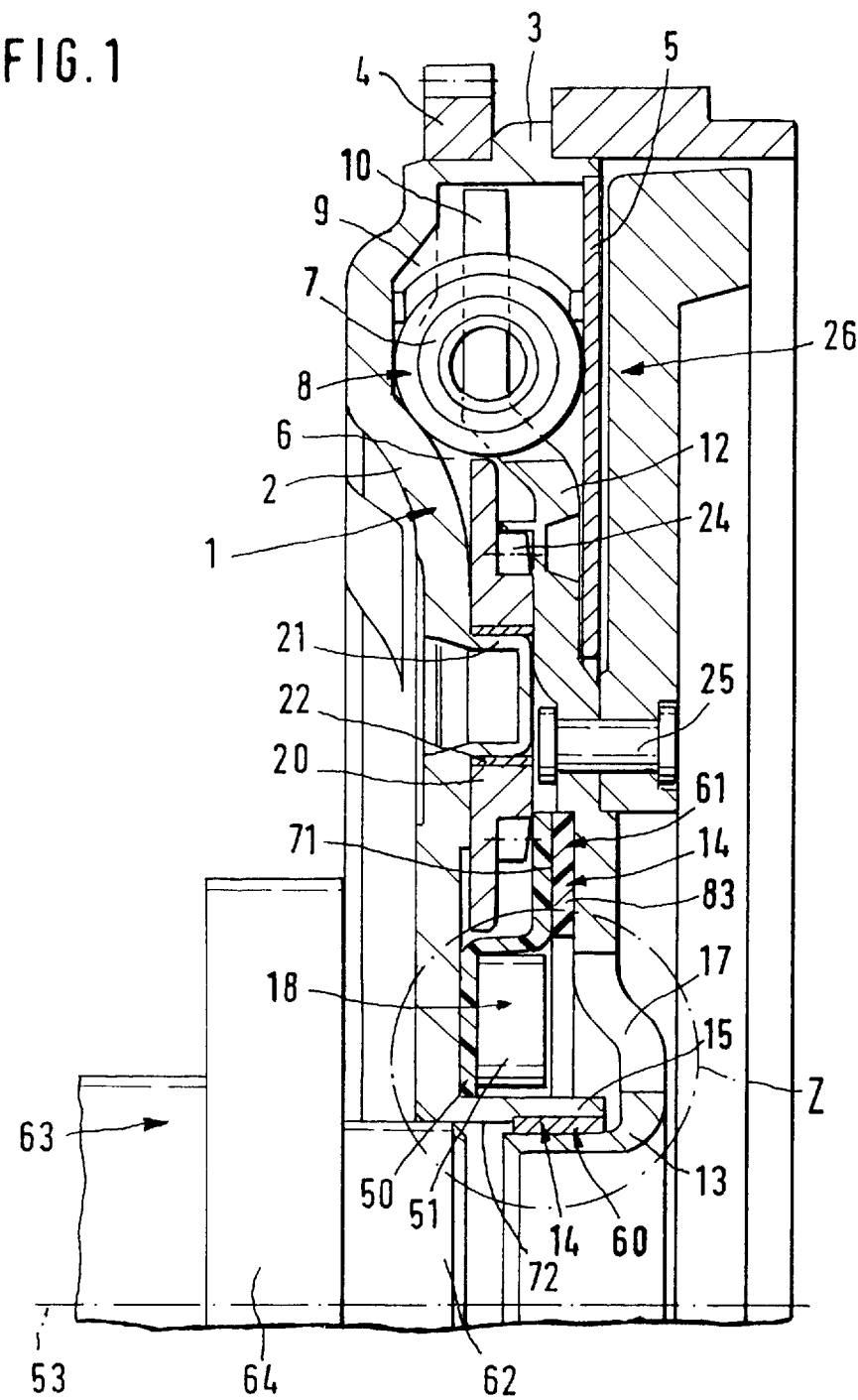
FIG. 1 shows a longitudinal section through a one-half view of the inertial mass device with a radial plain bearing and an axial plain bearing which is spatially separate from the radial plain bearing.

The inertial mass device illustrated in FIG. 1 has an output-side inertial mass 26 and an input-side inertial mass 1, which input-side inertial mass 1 is realized with a primary flange 2 which runs toward the radial outside, and in the peripheral area the input-side inertial mass 1 has an axial edge 3 on which is placed a toothed rim 4 which can be engaged with a starter pinion (not shown). Fastened to the axial edge 3 is a sealing plate 5 which projects radially inward. The sealing plate 5, together with the axial edge 3 and the primary flange 2, defines a grease chamber 6, in which there are elastic elements 7 of a damping device 8, which elastic elements 7 run in the peripheral direction in the radially outer area. The elastic elements 7 can be pressed against the primary flange 2 on one hand by actuator elements 9, while on the other hand, the elastic elements 7 are supported on radially outward projecting fingers 10 of a hub disc 12 which has, on its radially inner end, a secondary hub 13 to hold a radial plain bearing 60 of a bearing arrangement 14. This radial plain bearing 60 for its part supports a primary hub 15 of the primary flange 2. Viewed in the axial direction, the primary hub 15, starting from the primary flange 2, extends with its free end 68 (See FIG. 2) toward the hub disc 12, while the secondary hub 13 runs from the hub disc 12 with its free end 69 (See FIG. 2) toward the primary flange 2. Such a hub consisting of a primary and a secondary hub is advantageously manufactured by a non-cutting deformation process such as deep drawing, for example, whereby, if a deformation tool with an extremely hard and smooth surface is used, respective hubs 15, 13 are formed which are extremely smooth on their side facing the radial bearing arrangement 60, i.e. they can be given a surface roughness between Rz1 and Rz4. This feature is of importance in the event of a thrust movement of one of the inertial masses 1, 26 toward the radial plain bearing 60. If the simple bearing is provided with a relatively soft coating 79 at least on a track 70 illustrated in FIG. 2, in the event of the above mentioned axial relative movement, this coating is not scraped off a high-strength carrier material 78 by the corresponding hub 13, as also illustrated in FIG. 2. This carrier material 78 is preferably steel.

The hub disc 12, which is connected by means of rivets 25 to the output-side inertial mass 26, is located so that it can rotate on the input-side inertial mass 1 by the radial plain bearing 60. Radially close outside the radial plain bearing 60, the hub disc 12 is provided with installation apertures 17, through which fastening means 18 can be inserted. These fastening means, with their heads 51, hold a seal 50, by means of which the grease chamber 6 can be sealed radially inwardly. The inertial mass device can be fastened by means of the fastening means 18 to a crankshaft 64 of a drive system 63, such as an internal combustion engine, and in particular such that the crankshaft 64 is held in place by means of a shaft stub 62 which projects into the primary hub 15 of the input-side inertial mass 1 in a radial centering fixture 72 of the input-side inertial mass 1.

Radially outside the fastening means 18, axially between the seal 50 and the hub disc 12, there is an axial plain bearing 61 of the bearing arrangement 14, which will be discussed in greater detail below with reference to FIG. 1. At this point, however, it should be mentioned that the primary flange 2 has bearing lugs or extensions 21 which project toward the hub disc 12, on each of which lugs 21 a planet wheel 20 is rotationally mounted by means of a plain bearing 22. The planet wheel 20 has a toothing 24 engaged with toothing on the hub disc 12 which acts as a ring gear 55 (see FIG. 6).

FIG. 2 shows an enlarged detail of the bearing arrangement 14. The radial plain bearing 60 is thereby located radially between an inner peripheral side 90 of the primary hub 15 and an outer peripheral side 91 of the secondary hub 13, and namely such that the end 73 of the radial plain bearing 60 which faces the shaft stub 62 of the crankshaft 64 is placed axially as close as possible to the shaft stub 62, but only so far that it is not pressed by a projection 95 which extends radially inward on the centering fixture 72 on a radially smaller diameter. Additionally, the above mentioned end 73 of the radial plain bearing 60 is extended in the axial direction until it is very close to the free end 69 of the secondary hub 13. As a result of the extreme closeness of the radial plain bearing 60 to the crankshaft 64 and thus to the nearest main bearing (not shown) of the drive system 63, the wobbling movements which are applied to the end of the crankshaft 64 shown in FIGS. 1 and 2 cause only relatively small displacements on the radial plain bearing 60, in particular if the plain bearing 60, as shown in FIGS. 1 and 2, is located at a small radial distance from the axis of rotation 53 (see FIG. 1) of the inertial masses 1 and 26. To make the radial plain bearing 60 even less sensitive to the above mentioned wobbling movements of the crankshaft, and thus of the input-side inertial mass 1 which is fastened to the crankshaft, FIG. 2 shows how the ends 73 of the plain bearing 60, on its side facing the track 70, are each provided with a reduced cross section 74 in the form of a rounding-off 75, so that in the event of the introduction of a wobbling movement via the primary hub, no stress peaks can build up which have the potential to tip or damage the radial bearing arrangement. As illustrated in FIG. 2, between the radial bearing arrangement 60 and the secondary hub 13 which shares the track 70 with the radial bearing system 60, there is a clearance 65 which is sized so that wobbling movements on the primary hub 15 can be transmitted only partly to the secondary hub 13, whereby, on account of this clearance, the output-side mass 26 is able, under the action of the centrifugal forces which occur during the rotation of the inertial mass device, to perform a self-stabilization. In this manner, it becomes possible to prevent the transmission of the wobbling movements to a transmission shaft (not shown) of a transmission which is located downstream of or on the output side of the inertial mass device.

With regard to the realization of the radial plain bearing 60, it should also be noted that, as shown in greater detail in FIG. 3, before installation into the primary hub 15, the radial plain bearing 60 consists of a ring 93 which is split at a point on its periphery, namely by an axial seam 92. For pressing into the primary hub 15, the ring 93 is compressed, in particular so that the two ring ends 94 come into contact with one another, closing the seam 92, and in particular not without force, but following the application of a force in the tangential direction, whereby the radial plain bearing 60 is held in the primary hub 15 under a radial bias. Then, as shown in FIGS. 1 or 2, the secondary hub 13 is inserted into the radial plain bearing 60, which is possible with relatively low axial resistance on account of the clearance 65. In the assembled condition, the two inertial masses 1 and 26 are held in this axial relative position by the preload of a commercial clutch release bearing (not shown), whereby under optimum conditions, a displacement movement can occur between the radial plain bearing 60 and the secondary hub 13 if, when a wobbling movement is initiated, a movement component opposite to the clutch release bearing preload becomes active, and the force of which is greater than the clutch release bearing preload. In this case, the input-side inertial mass 1, and with it the radial plain bearing 60 illustrated in FIGS. 1 and 2 is displaced toward the right, while the output-side inertial mass 26, on account of the clutch release bearing preload, remains in its position as illustrated in FIGS. 1 and 2. Because otherwise, no axial forces are acting on the radial plain bearing 60, on account of the lack of axial movement of the output-side inertial mass 26, and in spite of the wobbling motion introduced on the input side, there are no vibrations experienced at the clutch pedal (not shown), which vibrations would otherwise be transmitted to the clutch pedal (not shown) as a result of axial forces acting opposite to the pre-load of the clutch release bearing via the output-side inertial mass 26, and via the conventional clutch pedal which is fastened to the inertial mass 26.

With regard to the construction of the radial plain bearing 60, it should also be noted that it consists of a high-strength carrier material 78, preferably steel, which is provided with a relatively soft coating 79, preferably of a fusion-sintered porous bronze layer, into the pores of which a mixture of polytetrafluoroethylene (PTFE) and a dry lubricant such as graphite or PEEK (polyetheretherketone) is rolled.

As illustrated in FIGS. 1 and 2, the bearing arrangement 14, in addition to the radial plain bearing 60, also has the axial plain bearing 61, which as shown in FIG. 2 is in contact on one hand with the hub disc 12 and on the other hand has clearance 66 between it and the neighboring seal 50. This clearance 66, like the above mentioned clearance 65 on the radial plain bearing 60, ensures on one hand that wobbling movements of the input-side inertial mass 1 are transmitted only partly to the output-side inertial mass 26, and on the other hand the inertial mass 26, under the action of centrifugal forces, can achieve a self-stabilization when the inertial mass device is in rotation. The axial plain bearing 61 as shown in FIGS. 1 and 2 is placed relatively far outside, so that it can absorb wobbling movements of the input-side inertial mass 1, thereby providing optimal protection for the radial plain bearing 60. As shown in FIGS. 1 and 2, the axial plain bearing is thereby simply placed between the seal 50 and the hub disc 12, and accordingly absorbs relative movements which necessarily occur when the two inertial masses 1, 26 are displaced toward one another, because the seal 50 is fastened to the input-side inertial mass 1 and the hub disc 12 is fastened to the output-side inertial mass 26. The friction which occurs on both sides of the axial plain bearing 61 on account of this relative movement, does not cause any damage if the plain bearing 61 is made of plastic, which can be reinforced with glass fiber to increase its strength. An advantageous material for such a friction bearing has been found to be polytetrafluoroethylene (PTFE), also known as Teflon, which has excellent lubricating properties, which can be important, in particular when a glass fiber reinforcement is used. PEEK (polyetheretherketone) has also been found to be an appropriate plastic. The axial plain bearing 61 then has a track or race 83 on its side facing the output-side inertial mass 26.

Figure 7:
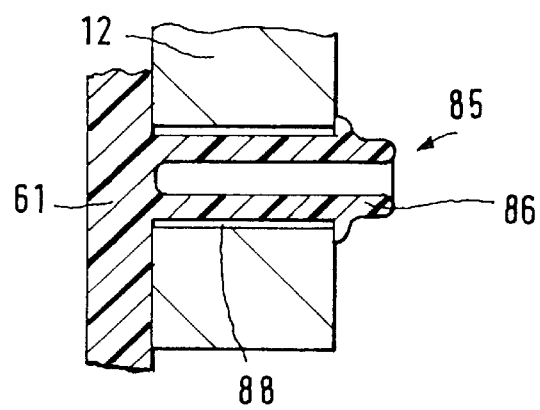
FIG. 7 shows a fastening element for the attachment of the axial plain bearing to the corresponding inertial mass.

If, in spite of the use of the axial plain bearing 61 made of plastic, there is to be no relative movement between the axial plain bearing 61 and the hub disc 12 which is used to locate it, it is possible to realize recesses 88 in the hub disc 12, as shown in FIG. 7, which recesses 88 are penetrated by axial fastening means 85 in the form of clips 86 formed on the axial plain bearing 61, whereby the clips 86 then hold the hub disc 12 from behind. The axial plain bearing 61 accordingly has a friction surface only on its side facing the seal 50. The track 71 of the axial plain bearing 61 is also on this side, as with the radial plain bearing 60 illustrated in FIGS. 1 and 2.

If conditions require that the axial plain bearing 61 must be manufactured from a material which is stronger than plastic, as with the radial plain bearing 60, a high-strength carrier material 80 can be provided, which is preferably steel and is provided with a relatively soft coating 81 which is formed by the fusion sintering of a porous bronze layer, into the pores of which a mixture of polytetrafluoroethylene (Teflon) and a dry lubricant such as graphite is rolled. The axial plain bearing 61 would thereby be inserted so that the side with the soft coating 81 forms the track 71 and accordingly faces the seal 50. The opposite side, made of steel, would be frictionally connected to the hub disc 12, which would result in wear. To prevent such wear, as shown in FIG. 4, a device 82 to prevent rotation is provided between the hub disc 12 and the axial plain bearing 61, namely in the form of a toothing between these two elements, whereby the toothing allows no clearance or play in the peripheral direction. Otherwise, the embodiment illustrated in FIG. 4 is the same as the embodiment illustrated in FIG. 1, for which reason no additional reference numbers have been entered in this drawing.

FIG. 5 shows a hub disc 12 which, in the radially inner area, is realized so that it has a cross section which is very thin compared to the radially outer area, and thereby holds mountings 76 which are elastic in the axial direction. Consequently, wobbling movements which occur on the input-side inertial mass 1 and thus on the primary hub 15 and the radial plain bearing 60, can be absorbed by the secondary hub 13 by deflection. As soon as the wobbling movement decays, the mounting 76 and thus the secondary hub 13 return to their original position on account of the elastic return force. This measure means that it is possible to reduce the surface pressure on the radial plain bearing 60 even further, without thereby transmitting wobbling movements to the output-side inertial mass 26 to a greater extent than in the embodiments described above.

Figure 6:
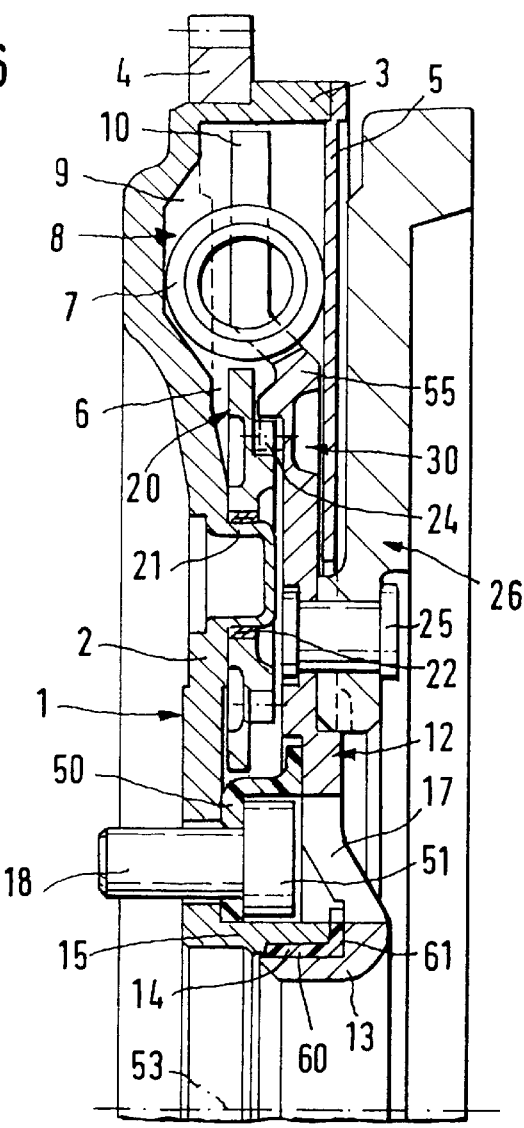
FIG. 6 is similar to FIG. 1, but with a one-piece realization of the radial and axial plain bearing.

While in the embodiment described above, the axial plain bearing 61 was located at a significant radial distance outside the radial plain bearing 60, in the embodiment illustrated in FIG. 6 the axial plain bearing 61 is realized in one piece with the radial plain bearing 60. It is also conceivable, when the axial plain bearing 61 is realized in two parts, that it can be directly adjacent to the radial plain bearing 60. Such a construction promotes a compact design of the inertial mass device.

Figure 8:
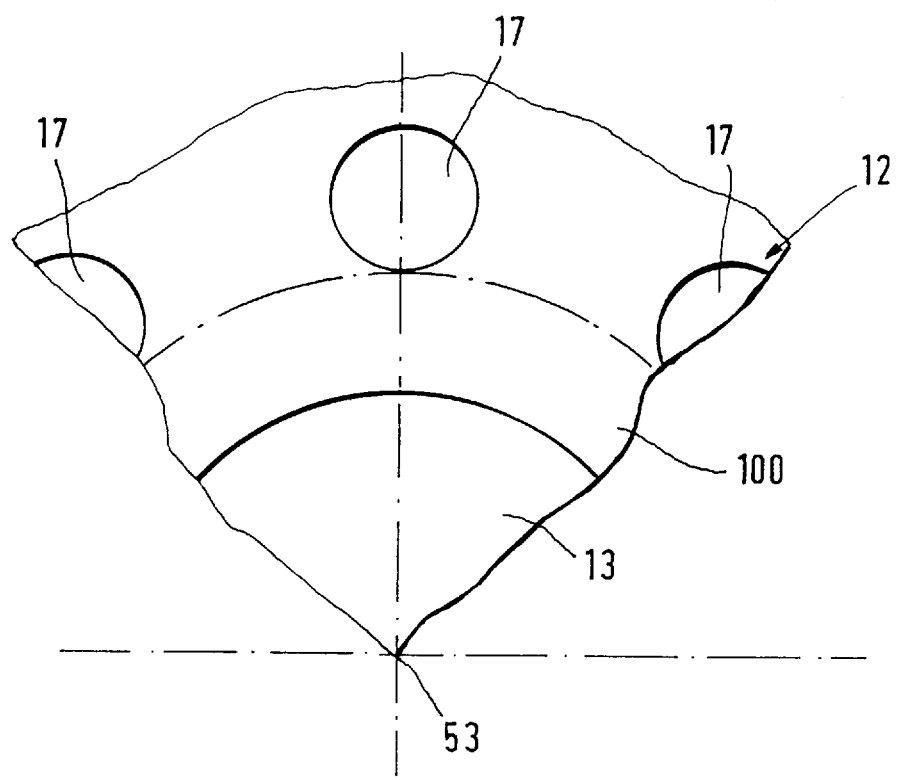
FIG. 8 shows a view of the detail illustrated in FIG. 2, from the output side.

As shown in FIGS. 2, 2A and 8, beginning from the secondary hub 13 of the hub disc 12, a ring-shaped web 100 is realized which extends radially outward and has an axial space 101 between itself and the radial plain bearing 60 and between itself and the primary hub 15 of the input-side inertial mass 1. The web 100 extends radially outward to the radial outside of the primary hub 15, where the installation openings 17 are realized at specified points of the periphery of the hub disc 12, as shown in FIG. 8. These installation openings 17, which are provided specifically for the insertion and tightening of fastening means 18, also act, during the rotation of the inertial mass device, to promote an air current from the output side of the inertial mass device in the area which is axially between the two inertial masses 1 and 26. As this cooling air flows in, solid particles are also carried along with it, which solid particles have been released in particular as a result of abrasive wear to the friction linings of a clutch disc (not shown) of the output-side friction clutch. Because the web 100 is extended radially outward to the outside of the primary hub 15, these solid particles cannot penetrate into the axial space 101, but after passing through the installation openings 17, they continue on a linear path for some time, until they strike the outside of the primary hub 15. Thus the solid particles are removed from the vicinity and effective area of the radial plain bearing 60.

Because the installation openings 17 are realized in the hub disc 12, in FIG. 8 the web 100 itself is shown extending radially outward by dashed-dotted lines. In an actual realization of the inertial mass device the web would extend between two installation openings 17 radially beyond the dashed-dotted line.

One feature of the invention resides broadly in the inertial mass device which has at least two inertial masses which can rotate relative to one another against the action of elastic elements of a damping device, one of which inertial masses, namely the output-side inertial mass which is farther from a drive system, such as for example the crankshaft of an internal combustion engine, is guided both radially and axially by means of a bearing arrangement with respect to the input-side inertial mass, whereby the bearing arrangement has at least one axial plain bearing and one radial plain bearing, characterized by the fact that both the radial plain bearing 60 and the axial plain bearing 61 each guide the output-side inertial mass 26 with respect to the input-side inertial mass 1 with a clearance or play 65, 66, the size of which is determined so that when a wobbling movement is introduced from the crankshaft 64 of the drive system 63 to the input-side inertial mass 1, the output-side inertial mass 26, under the effect of centrifugal forces, can perform a self-stabilization, and the radial plain bearing 60, to bring it as close as possible to the crankshaft 64, is engaged in the vicinity of the end 69 of the hub 13 of the output-side inertial mass 26, which end 69 faces the crankshaft 64.

Another feature of the invention resides broadly in the inertial mass device characterized by the fact that the radial plain bearing 60, on its diameter which is provided as a track 70 facing the hub 13 of the corresponding inertial mass 26, has a maximum of the diameter for a centering 72 of the crankshaft 64 of the drive system 63 in the input-side inertial mass 1.

Yet another feature of the invention resides broadly in the inertial mass device characterized by the fact that the radial plain bearing 60, at least on its diameter which is provided as a track 70, is realized on its axial ends 73 with a reduced cross section 74 which increases the distance to the hub 13 of the corresponding inertial mass 26.

Still another feature of the invention resides broadly in the inertial mass device characterized by the fact that the reduced cross section 74 is achieved by a rounding-off 75 or phase or taper.

A further feature of the invention resides broadly in the inertial mass device characterized by the fact that the hub 13 which forms the track 70 for the radial plain bearing 60 is located on the corresponding inertial mass 26 by means of a mounting 76 which is elastically deformable in the axial direction.

Another feature of the invention resides broadly in the inertial mass device characterized by the fact that the radial plain bearing 60, before the installation into the hub 15 of the corresponding inertial mass 1, is realized in the form of a ring 93 which has an axial seam 92, whereby the diameter of the ring exceeds that of the hub 15, and whereby the seam 92 is closed by pressing the plain bearing 60 into the hub 15 and the plain bearing 60 is held with bias in the radial direction by the application of force by means of the two ends 94 of the ring.

Yet another feature of the invention resides broadly in the inertial mass device characterized by the fact that the radial plain bearing 60 is made of a high-strength carrier material 78 which is provided with a softer coating 79 on its side which faces the track 70.

Still another feature of the invention resides broadly in the inertial mass device characterized by the fact that the carrier material 78 of the radial plain bearing 60 consists of steel and the coating 79 is formed by the sinter-fusing of an alloy, which preferably consists of porous bronze with inclusions of polytetrafluoroethylene and optionally a dry lubricant such as graphite.

A further feature of the invention resides broadly in the inertial mass device characterized by the fact that the axial plain bearing 61, on its minimum diameter, has at least the diameter of the radial plain bearing 60.

Another feature of the invention resides broadly in the inertial mass device characterized by the fact that the axial plain bearing 61 is provided adjacent to the radial plain bearing 60.

Yet another feature of the invention resides broadly in the inertial mass device characterized by the fact that the axial plain bearing 61 is realized in one piece with the radial plain bearing 60.

Still another feature of the invention resides broadly in the inertial mass device characterized by the fact that the axial plain bearing 61 consists of a high-strength carrier material 80 which, on its side which faces the track 71, is provided with a softer coating 81.

A further feature of the invention resides broadly in the inertial mass device characterized by the fact that the carrier material 80 of the axial plain bearing 61 consists of steel and the coating 81 is formed by sinter-fusing an alloy, which preferably consists of porous bronze with inclusions of polytetrafluoroethylene and optionally a dry lubricant such as graphite.

Another feature of the invention resides broadly in the inertial mass device characterized by the fact that the side of the axial plain bearing 61 which is realized with the carrier material 80 comes into contact with the neighboring inertial mass 26 when a device to prevent rotation 82 with the inertial mass 26 is used.

Yet another feature of the invention resides broadly in the inertial mass device characterized by the fact that the axial plain bearing 61 is made of plastic and has a track 71, 83 with respect to or facing each of the two inertial masses 1, 26.

Still another feature of the invention resides broadly in the inertial mass device characterized by the fact that the axial plain bearing 61 has a glass fiber reinforcement.

A further feature of the invention resides broadly in the inertial mass device characterized by the fact that corresponding to the axial plain bearing 61, there are axial fastening means 85 for connection to a neighboring component 12.

Another feature of the invention resides broadly in the inertial mass device characterized by the fact that the fastening means 85 are formed by clips 86, which penetrate the corresponding recesses 88 and engage them from behind.

Yet another feature of the invention resides broadly in the inertial mass device characterized by the fact that the two inertial masses 1, 26, on their radially inner ends, each have a hub 15, 13 which is directed toward the respective other inertial mass 1, 26 and is manufactured by a non-cutting deformation process such as deep drawing or swaging, which hubs, by means of each of their peripheral sides 90, 91 come into contact with the radial plain bearing 60, whereby one hub 15 acts to provide a fixed location for the radial plain bearing 60 and the other hub 13 acts as a track 70 for this plain bearing 60.

Still another feature of the invention resides broadly in the inertial mass device characterized by the fact that the hubs 15, 13 of the inertial masses 1, 26 have a smaller material cross section, on account of the non-cutting deformation, than the other areas of the inertial masses 1, 26.

A further feature of the invention resides broadly in the inertial mass device characterized by the fact that the hubs 15, 13, on their sides facing the respective radial plain bearing 60 are realized with a surface roughness between rZ1 and rZ4 or RZ1 and RZ4.

Another feature of the invention resides broadly in the inertial mass device characterized by the fact that the two inertial masses 1, 26 are biased toward one another in the axial direction only under the action of the clutch release bearing preload bias.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 196 20 698.7, filed on May 23, 1996; 196 19 059.2, filed on May 13, 1996; and 196 09 043.1, filed on Mar. 8, 1996, having inventors Jörg Sudau, Bernhard Schierling, Hilmar Göbel, Jörgen Kleifges, and Cora Carlson, and DE-OS 196 20 698.7, filed on May 23, 1996; 196 19 059.2, filed on May 13, 1996; and 196 09 043.1, filed on Mar. 8, 1996 and DE-PS 196 20 698.7, filed on May 23, 1996; 196 19 059.2, filed on May 13, 1996; and 196 09 043.1, filed on Mar. 8, 1996, and the references cited in any of the documents cited are hereby incorporated by reference as if set forth in their entirety herein.

The corresponding foreign patent publication application, namely, Federal Republic of Germany Patent Application No. 196 45 174.4, filed on Nov. 2, 1996, are hereby incorporated by reference as if set forth in their entirety herein.

An example of a torsional vibration damper, and components associated therewith which may be incorporated in embodiments of the present invention may be found in the following U.S. Pat. No. 5,551,928, having the inventor Jörg Sudau, entitled "Torsional Vibration Damer with Planetary Gearset"; which is hereby incorporated by reference as if set forth in its entirety herein.

U.S. patent application, Ser. No. 08/813,105, filed on or about Mar. 7, 1997, and claiming priority from Federal Republic of Germany Application No. 196 09 041.5, having attorney Docket No. NHL-FIS-265, having the inventor Jörg Sudau, and claiming priority from DE-OS 196 09 041.5 and DE-PS 196 09 041.5, and having the title "Flywheel for a Motor Vehicle, the Flywheel Having a Torsional Vibration Damper" are hereby incorporated by reference as if set forth in their entirety herein.

U.S. patent application, Ser. No. 08/665,465, filed Jun. 18, 1996, and claiming priority from Federal Republic of Germany Application No. P 44 22 732.9 and P 43 43 802.4, and having Attorney Docket No. NHL-FIS-65-D, having the title "Torsional Vibration Damper with a Planetary Gearset", having the inventor Jörg Sudau are hereby incorporated by reference as if set forth in their entirety herein.

U.S. patent application, Ser. No. 08/812,584, having Attorney Docket No. NHL-FIS-272, filed on or about Mar. 7, 1997, and claiming priority from Federal Republic of Germany Patent Application No. 196 09 043.1, filed on Mar. 8, 1996, having inventors Jörg Sudau, Bernhard Schierling, and Hillmar Göbel, and DE-OS 196 09 043.1 and DE-PS 196 09 043.1 are hereby incorporated by reference as if set forth in their entirety herein.

Examples of clutches, and components associated therewith which may be utilized in accordance with embodiments of the present invention, may be found in the following U.S. Pat. No. 5,000,304; No. 4,941,558; No. 4,854,438; No. 4,741,423; and No. 4,715,485.

Examples of torsional vibration dampers, and components associated therewith, which may be used in accordance with embodiments of the present invention, may be found in the following U.S. Pat. No. 5,016,744; No. 4,433,771; No. 4,684,007; No. 4,697,682; No. 4,890,712; and No. 4,651,857.

Examples of plain bearings and components associated therewith which may be used in conjunction with embodiments of the present invention may be found in the following U.S. Pat. No. 5,188,463; No. 5,192,137; No. 5,267,797; No. 5,275,493; and No. 5,324,199.

Examples of thrust bearings and components associated therewith which may be used in conjunction with embodiments of the present invention may be found in the following U.S. Pat. No. 5,386,630; No. 5,399,042; No. 5,407,282; No. 5,416,154; No. 5,429,080; No. 5,433,536; No. 5,445,456; No. 5,462,365; and No. 5,474,390.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:
   a flywheel, said flywheel having an axis of rotation and defining an axial direction parallel to said axis of rotation said flywheel comprising:
   a first inertial mass;
   said first inertial mass comprising a portion;
   said first inertial mass comprising a hub, said hub of said first inertial mass being disposed substantially transverse to said portion of said first inertial mass;
   a second inertial mass;
   said second inertial mass comprising a portion;
   said second inertial mass comprising a hub, said hub of said second inertial mass being disposed substantially transverse to said portion of said second inertial mass; and
   said hub of said first inertial mass being disposed adjacent to and substantially parallel to said hub of said second inertial mass;
   a housing;
   a damping structure;
   said damping structure being disposed to limit motion of said first inertial mass and said second inertial mass with respect to each other;
   said flywheel further comprising:
   a bearing arrangement;
   said bearing arrangement being disposed to guide said second inertial mass with respect to said first inertial mass;
   said bearing arrangement comprising:
   an axial bearing;
   said axial bearing being disposed adjacent to said portion of said second inertial mass;
   said axial bearing being disposed to provide a first clearance to substantially minimize transfer of wobbling of said first inertial mass, from said first inertial mass to said second inertial mass;
   a radial bearing;
   said radial bearing being disposed between said hub of said first inertial mass and said hub of said second inertial mass; and
   said radial bearing being disposed to provide a second clearance to substantially minimize transfer of wobbling of said first inertial mass, from said first inertial mass to said second inertial mass.

2. The friction clutch according to claim 1 wherein:
   said hub of said second inertial mass has an end;
   said end of said hub of said second inertial mass is configured to be disposed toward a crankshaft of a motor vehicle; and
   said radial bearing is disposed adjacent said end of said hub of said second inertial mass to minimize the distance between said radial bearing and a crankshaft of a motor vehicle.

3. A flywheel for a motor vehicle friction clutch, said flywheel comprising:
   said flywheel having an axis of rotation and defining an axial direction parallel to said axis of rotation;
   a first inertial mass;
   said first inertial mass comprising a portion;
   said first inertial mass comprising a hub, said hub of said first inertial mass being disposed substantially transverse to said portion of said first inertial mass;
   a second inertial mass;
   said second inertial mass comprising a portion;
   said second inertial mass comprising a hub, said hub of said second inertial mass being disposed substantially transverse to said portion of said second inertial mass;
   said hub of said first inertial mass being disposed adjacent to and substantially parallel to said hub of said second inertial mass;
   a damping structure;
   said damping structure being disposed to limit motion of said first inertial mass and said second inertial mass with respect to each other;
   a bearing arrangement;
   said bearing arrangement being disposed to guide said second inertial mass with respect to said first inertial mass;
   said bearing arrangement comprising:
   an axial bearing;
   said axial bearing being disposed adjacent to said portion of said second inertial mass;
   said axial bearing being disposed to provide a first clearance to substantially minimize transfer of wobbling of said first inertial mass, from said first inertial mass to said second inertial mass;
   a radial bearing;
   said radial bearing being disposed between said hub of said first inertial mass and said hub of said second inertial mass; and
   said radial bearing being disposed to provide a second clearance to substantially minimize transfer of wobbling of said first inertial mass, from said first inertial mass to said second inertial mass.

4. The flywheel according to claim 3 wherein:
   said hub of said second inertial mass has an end;

said end of said hub of said second inertial mass is configured to be disposed toward the crankshaft of the motor vehicle; and said radial bearing is disposed adjacent said end of said hub of said second inertial mass to minimize the distance between said radial bearing and a crankshaft of a motor vehicle.

5. The flywheel according to claim 4 wherein:

said radial bearing has a first edge disposed adjacent said end of said hub of said second inertial mass;

said radial bearing has a second edge disposed opposite said first edge;

said radial bearing has a first thickness, a second thickness and a third thickness defined substantially transverse to said axial direction;

said first thickness being defined at said first edge of said radial bearing;

said second thickness being defined at said second edge of said radial bearing;

said third thickness being defined between said first edge of said radial bearing and said second edge of said radial bearing; and said third thickness being greater than both said first thickness and said second thickness.

6. The flywheel according to claim 5 wherein said third thickness of said radial bearing is configured to center said first inertial mass about a crankshaft of a motor vehicle.

7. The flywheel according to claim 6 wherein said first and second edges of said radial bearing are one of: rounded off and tapered.

8. The flywheel according to claim 7 wherein:

said hub of said first inertial mass is disposed about said hub of said second inertial mass;

said radial bearing is a ring-shaped radial bearing;

said ring-shaped radial bearing comprises two ends;

said ring-shaped radial bearing is disposed between said hub of said first inertial mass and said hub of said second inertial mass;

said ring-shaped radial bearing-has an outer diameter;

said hub of said first inertial mass has an inner diameter;

said outer diameter of said ring-shaped radial bearing is greater than said inner diameter of said hub of said first inertial mass; and said two ends of said ring-shaped radial bearing are disposed to press against one another to form a seam through said ring-shaped radial bearing to allow said ring-shaped radial bearing to be disposed within said hub of said first inertial mass and to bias said ring-shaped radial bearing against said hub of said first inertial mass.

9. The flywheel according to claim 8 wherein:

said ring-shaped radial bearing has a first side and a second side;

said first side of said ring-shaped radial bearing is disposed adjacent said hub of said first inertial mass;

said second side of said ring-shaped radial bearing is disposed adjacent said hub of said second inertial mass;

said-first side of said ring-shaped radial bearing comprises a first material and said second side of said radial bearing comprises a second material; and said first material is a material of greater hardness than said second material.

10. The flywheel according to claim 9 wherein:

said axial bearing has a width; and the width of said axial bearing is one of: equal to and greater than the third width of said radial bearing.

11. The flywheel according to claim 10 comprising one of a) and b):

a) said second inertial mass comprising a section;

said section of said second inertial mass being disposed between said portion of said second inertial mass and said hub of said second inertial mass; and said section of said second inertial mass being deformable in said axial direction; and b) said hub of said second inertial mass and said portion of said second inertial mass comprising one piece;

said hub of said second inertial mass being formed by non-cutting deformation of said second inertial mass;

said hub of said second inertial mass having a side, said side being disposed adjacent said radial bearing; and said side of said hub of said second inertial mass having a surface roughness between $R_z1$ and $R_z4$.

12. The flywheel according to claim 11 wherein:

said first material comprises steel; and said second material comprises bronze and polytetrafluoroethylene.

13. The flywheel according to claim 11 wherein said axial bearing is disposed adjacent said radial bearing.

14. The flywheel according to claim 13 wherein said axial bearing and said radial bearing comprise a one-piece bearing device.

15. The flywheel according to claim 14 wherein:

said axial bearing has a first side and a second side;

said first side of said axial bearing is disposed adjacent said hub of said first inertial mass;

said second side of said radial bearing is disposed adjacent said hub of said second inertial mass;

said first side of said radial bearing comprises a third material and said second side of said radial bearing comprises a fourth material; and said third material is a material of greater hardness than said fourth material.

16. The flywheel according to claim 15 comprising:

a rotation lock;

said rotation lock being disposed adjacent said second inertial mass; and said rotation lock being engagable with said axial bearing to prevent rotation of said axial bearing with respect to said second inertial mass.

17. The flywheel according to claim 16 comprising:

a hub disc;

said hub disc being disposed between said first inertial mass and said second inertial mass;

said hub disc comprising a plurality of recesses;

a plurality of clips; and said plurality of clips being disposed through said plurality of recesses to connect said axial bearing to said hub disc.

18. The flywheel according to claim 17 wherein:

said third material comprises steel; and said fourth material comprises bronze and polytetrafluoroethylene.

19. The flywheel according to claim 17 wherein said third material comprises plastic.

20. The flywheel according to claim 19 wherein said axial bearing comprises glass fiber reinforcement.

* * * * *

UNITED STATES PATENT AND TRADEMARK OFFICE
CERTIFICATE OF CORRECTION

PATENT NO. : 5,878,856
DATED : March 9, 1999
INVENTOR(S) : Jörg SUDAU, Bernhard SCHIERLING, Hilmar GÖBEL, Jürgen KLEIFGES, and Cora CARLSON It is certified that error appears in the above-identified patent and that said Letters Patent is hereby corrected as shown below:

In column 4, line 38, before 'a' insert --As--.

In column 12, line 21, after 'Göbel,', delete "Jörgen" and insert --Jürgen--.

In column 12, line 58, after 'Ser. No.', delete "08/812,584," and insert --08/812,589,--.

Signed and Sealed this

Thirtieth Day of November, 1999

Attest:

Q. TODD DICKINSON

Attesting Officer

Acting Commissioner of Patents and Trademarks